Jan. 30, 1940.　　　　　G. H. SELF　　　　　2,188,614
TRACTOR DRIVEN BEAN HARVESTER
Filed Aug. 17, 1938　　　3 Sheets-Sheet 1

Grafton H. Self
INVENTOR
BY Victor J. Evans & Co.
ATTORNEYS

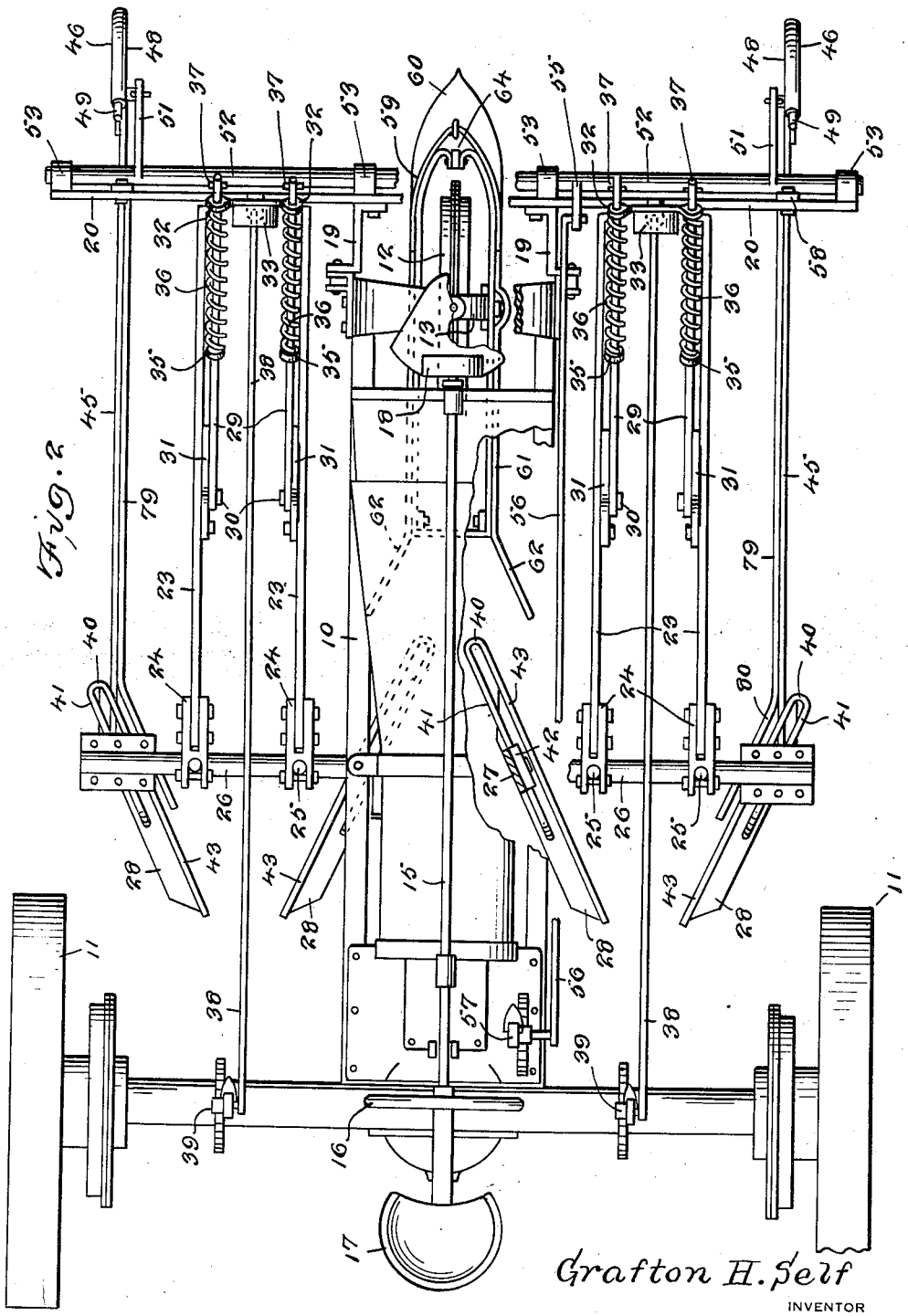

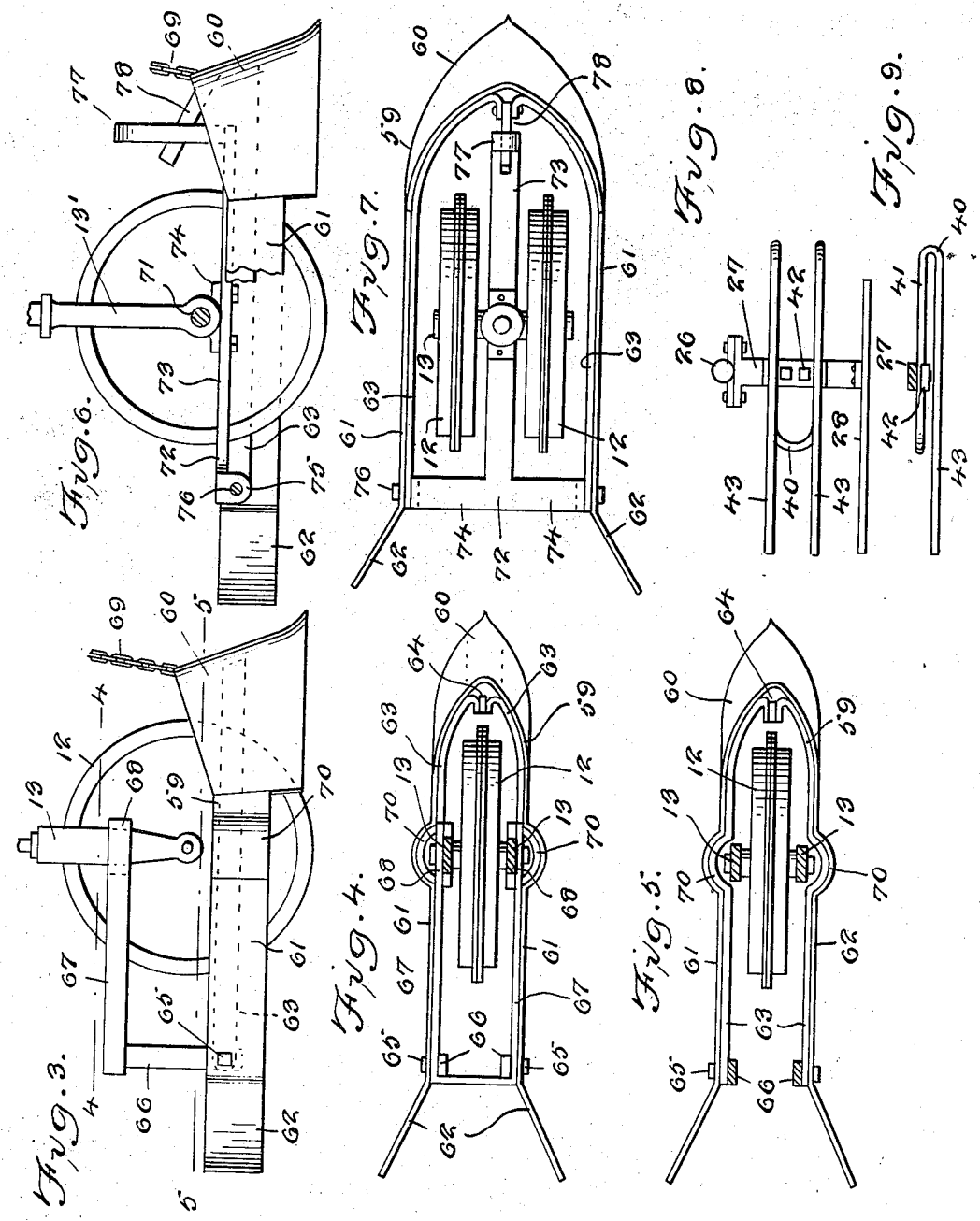

Patented Jan. 30, 1940

2,188,614

UNITED STATES PATENT OFFICE 2,188,614

TRACTOR DRIVEN BEAN HARVESTER

Grafton H. Self, Twin Falls, Idaho, assignor of one-half to Andrew J. Bockwitz, Twin Falls, Idaho Application August 17, 1938, Serial No. 225,437

9 Claims. (Cl. 56—25)

This invention relates to bean harvesters and without limitation thereto has more particularly to do with a harvesting mechanism of this character which may be provided as an attachment for the ordinary farm tractor.

The invention has for its principal object to provide a practical plant separating and cutting mechanism which may be applied to a tractor and operated and controlled by a commom controlling and operating means with which the tractor is equipped for operating cultivating and other attachments.

An important object is to provide an effective central plant divider which is mounted cooperatively about and movable with the front steering wheel or wheels of the tractor and to provide for relative vertical adjustment of said divider cooperatively and in conjunction with side plant separators or dividers.

A further object is to provide improved means for guiding the plants to the respective cutting elements and to provide for relative adjustment in the working relation between said guiding and cutting elements.

With the foregoing and other objects to be attained, as will hereinafter more fully appear, the invention consists in the novel general construction and in the parts and combinations and arrangements of parts thereof as hereinafter described and set forth with particularity in the appended claims, reference being had to the accompanying drawings, in which Figure 1 is a side elevation of a tractor with a harvesting attachment applied thereto in accordance with one practical embodiment of the invention;

Figure 2 is a top plan view;

Figure 3 is a fragmentary view, in side elevation, showing a form of mounting for the central divider as applied to a single front steering wheel of a tractor;

Figure 4 is a partial plan view and horizontal section taken on the line 4—4 of Figure 3;

Figure 5 is a similar view taken on the line 5—5 of Figure 3;

Figure 6 is a view, similar to Figure 3, but showing a modification of the central divider as applied to a double steering wheel;

Figure 7 is a top plan view of the modified structure shown in Figure 6;

Figure 8 is a fragmentary view, in side elevation, showing details of the mounting for the cutter element and a cooperating plant guiding element; and Figure 9 is a view showing further details of the adjustable mounting for the plant guiding element.

Figure 1:
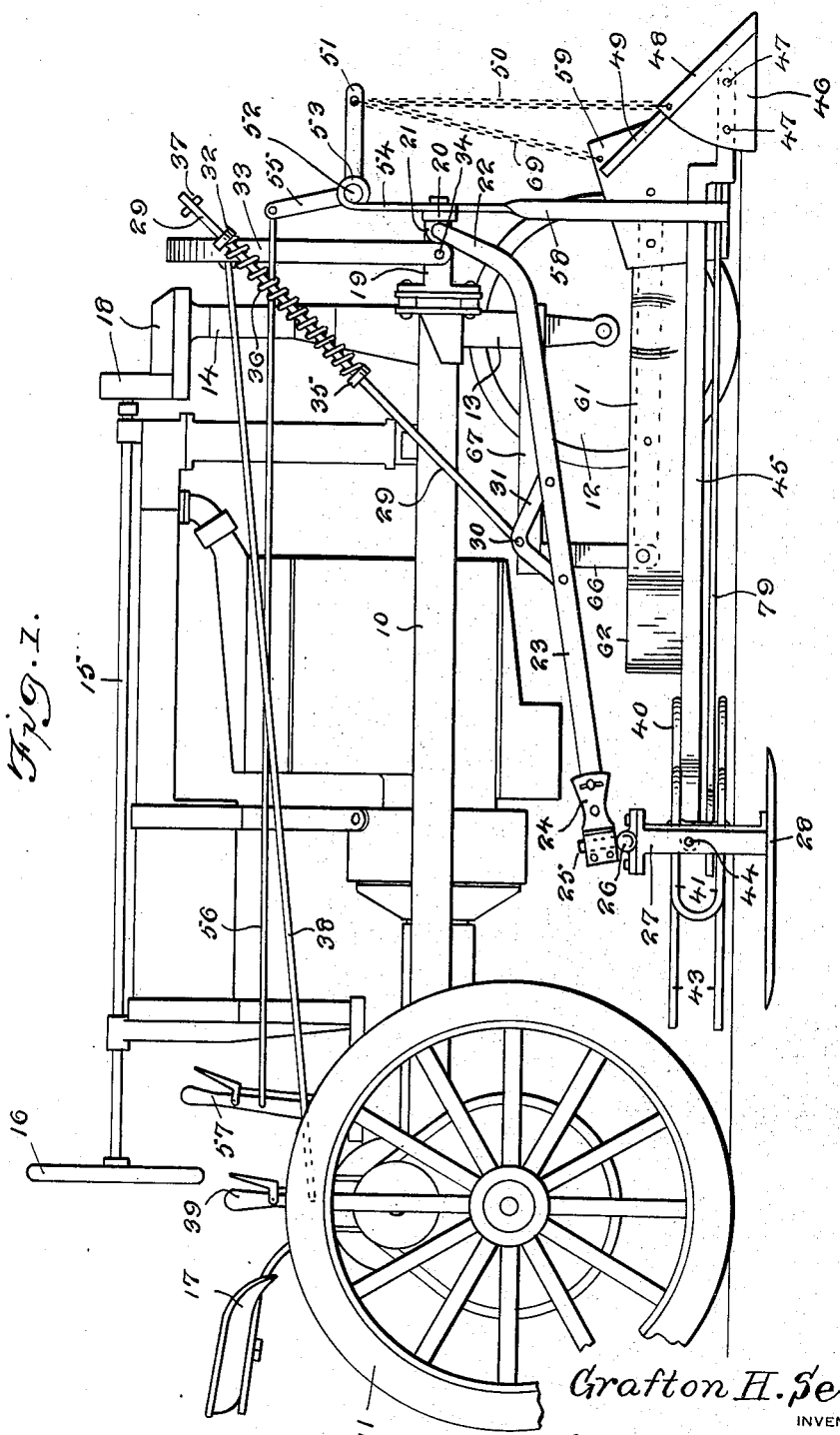

Referring now to the drawings the numeral 10 designates generally a tractor having the usual rear driving wheels 11 and front central steering wheel or wheels 12. In tractors of the type illustrated, either a single front steering wheel 12 or a pair thereof is mounted to swivel about a vertical axis, and in the case of a single wheel in a yoke 13 having a post or column extending upwardly through a pedestal or frame 14 on the front end portion of the frame of the tractor, the post or column (not shown) having a gear connection with horizontal steering shaft 15 provided with a hand wheel 16 in proximity to the operator's seat 17 for convenience in manipulation, said gear connection (not shown) being located in a housing 18 which is conventionally shown in Figures 1 and 2 of the drawings.

Mounted on forwardly extending brackets 19, at the front of the body frame of the tractor, is a cross bar 20 which extends a considerable distance on either side of the tractor frame, said cross bar 20 being that usually provided on a tractor for supporting various farming implements such as plow and cultivator attachments, and the like, and which bar is preferably utilized as the main support for carrying the several cooperative devices of the present invention.

On the rear side of said cross bar 20, near the opposite ends thereof, are bracket extensions 21 in which the upturned forward end portions 22 of draft bars 23 are pivotally mounted, said draft bars 23 being adjustably attached to brackets 24 at their rear ends, which latter are in turn adjustably mounted on pins 25 extending upwardly from an aligned pair of cross shafts or tool bars 26 each carrying a cutter unit, there being one of these units located on either side of the tractor frame.

The respective cross shafts or tool bars 26 terminate short of each other near the middle of the tractor, and depending from the opposite ends thereof are supporting standards 27 each having a cutter blade 28 at its lower end, said blades being arranged in cooperative pairs and in inclined relation to each other as shown clearly in Figure 2 and being yieldably supported in working relation on the surface of the ground or at a slight depth there-under by means of spring-pressed rods 29 which are pivotally mounted at their inner ends, as at 30, to upstanding bracket members 31 provided on the middle portions of said draft bars 23, the outer end portions of said rods 29 being mounted slidably in lugs 32 extending laterally on opposite sides of an inverted substantially U-shaped lever frame 33, which latter is pivotally mounted as at 34 on an inward extension of the bracket member 21 which supports said draft bars 23 on the cross bar 20.

In order to normally urge the rods 29 readwardly, said rods are provided with collars 35 and between said collars and the respective lugs 32 in which the rods are slidably supported are compression springs 36, the outer end portions of said rods 29 extending normally some distance beyond the lugs 32 and provided with a cross pin or head 37, by which arrangement the lever member 33 may be moved in one direction so as to hold the cutter elements 28 in their working relation to the ground under the pressure of said springs 36, as just above pointed out, or moved in the opposite direction whereby to bring said lugs 32 into engagement with said cross pins or heads 37 so as to lift or hold said cutter elements 28 out of working position above the ground.

For convenience in operating and holding said lever members 33 the latter are respectively connected by rods 38 to operating and controlling levers 39 located on opposite sides of the operator's seat 17. Preferably, the operating and controlling levers 39 are mounted on the axle casing for the rear traction wheels 11 and are the same levers usually provided on the tractor for operating the various farming tools or devices which are applied to the tractor as attachments and mounted on the cross shaft or tool bar 26 in place of the present invention.

Preferably, plant or vine guides 40 are mounted on the supporting standards 27 for said cutter elements 28. As shown, these guides 40 are formed of a single rod looped at its middle to provide an attaching portion comprising a spaced pair of arms 41 which are clamped to the standard 27 by a retaining block 42, whereby said guide may be adjusted longitudinally, the opposite end portions of said member 40 beyond the attaching portions 41 being re-bent to provide spaced longitudinal extensions 43 which extend parallel to the cutting edge of said cutter element 28 which is located some distance below them.

Pivotally mounted as at 44, on the supporting standard 27 for the cutter element 28, is a forwardly extending bar 45, at the outer end of which a side plant or vine separator 46 is mounted. As shown, this separator comprises a segmental blade or sector of sheet metal which is riveted, as at 47, to the bar 45 with one of its marginal portions disposed substantially horizontally and its angular marginal portion being rolled, as at 48, about a bar 49 which latter extends some distance upwardly beyond the arcuate marginal portion of the blade.

In practice, the separators 46, of which there is one at each side of the tractor, may be supported so as to travel close to the ground or at a slight elevation thereabove, or, in some cases, with its lower edge portion a slight distance below the ground surface (see Figure 1), said separators 46 being supported separately by chains 50 which are attached at their upper ends to forwardly extending crank arms 51 on a rock shaft 52 which is journaled at its opposite ends and also intermediate its ends, as at 53, on vertical supports 54 extending upwardly from said cross bar 20.

The rock shaft 52 is provided with an upstanding crank arm 55 which is connected by a rod 56 to an operating and controlling lever 57, which latter is mounted conveniently on the rear portion of the tractor in front of the operator's seat 17. In this connection, it is noted that said rock shaft 52 and operating and controlling lever 57, together with the respective connections therebetween, may be, and preferably are, the same parts usually provided on a farm tractor for operating and controlling various attachments interchangeably and the same are readily adaptable to the present invention without any material alteration therein. By this provision, the two side separators 46 are simultaneously raised and lowered and held in their adjusted working position by manipulation of the operating and controlling lever 57, which latter, as well as the hereinbefore described operating and controlling lever 39, may be obviously provided with the usual latch element which cooperates with a toothed sector usually provided for releasably locking such levers in normal and adjusted positions.

In order to guide the forward portions of the bars 45 in their vertical swinging movement and also to resist lateral thrust of the separator members 46 which are carried at the outer ends of said bars 45, depending elongated supports 58 slidably engaged by said bars 45 are provided on said cross bar 20, and, obviously, said supports 58 may be braced laterally from said cross bar 20 in any approved manner (not shown).

A central divider or plant and vine separator 59 comprising a forward hollow shoe portion 60 is pivotally mounted on the supporting element for the front steering wheel or wheels 12. In the case of a single wheel 12 this center divider, as shown in Figures 1 to 5, inclusive, comprises the forward shoe portion 60 and a rearwardly extending pair of elongated blade extensions 61 provided at their free ends with divergent wings 62, said shoe portion 60 and side extensions 61 being mounted on a counterpart reenforcing frame 63, said frame 63 comprising a pair of oppositely disposed longitudinal members whose forward end portions are converged correspondingly to the shape of the shoe portion 60 and joined to a filler member 64 which may extend substantially to the bottom of the contiguous front portion of the shoe. The frame members 63, shoe portion 60 and side extensions 61 may be secured together in any desirable manner, but preferably by a welding process.

The rear end portions of the longitudinal frame members 63 are pivotally attached, as at 65, to the lower end portions of depending arms 66 on a rigid substantially U-shaped bracket frame 67 whose end portions 68 are welded or otherwise rigidly secured to the opposite leg members of the wheel yoke 13, the shoe member 60 being attached by a chain 69 to a crank arm thereabove on the rock shaft 52 similar to the hereinbefore described crank arms 51 from which said plant and vine separators 46 are suspended by their respective chains 50. By this provision, the central divider 59 is raised and lowered simultaneously with said separators 46 by manipulation of the operating and controlling lever 57.

In order to minimize the width of said central divider 59 and locate the side blade extensions 61 in relatively close relation to the wheel 12 and at the same time avoid interference in a vertical swinging movement of said divider 59 on its pivotal axis 65, the adjacent opposite frame portions 63 and side plates 61 are bowed outwardly, as at 70, so as to clear the lower end portions of the yoke 13.

In the case of a double wheel structure, as shown in Figures 6 and 7, wherein the yoke 13 is eliminated and a single supporting stem or shank 13' is provided with a cross shaft 71 at its lower end on which the pair of wheels 12 are mounted at opposite sides of said stem or shank portion 13', the central divider 59 is correspondingly modified. As shown, the body portion of the device is substantially the same in general structure as to the parts 60, 61 and 63, except that it is necessarily made wider to straddle a pair of wheels instead of a single wheel as in the first described modification. In this double wheel adaptation of the central divider 59 the mounting includes a substantially T-shaped bracket member 72 whose longitudinal stem portion 73 is secured rigidly to lug portions 74 provided at the lower end of said stem or shank portion 13', the transverse portions 74 at the inner end of said bracket member 72 having down-turned ears 75 at their ends to which the frame members 63 are pivotally attached, as at 76. In this second mentioned modification, the shoe portion 60 is supported by the chain 69 from the crank arm on the rock shaft 52 in the same manner as in the hereinbefore described modification. In order to guide the divider 59 in its vertical swinging movement and at the same time resist lateral thrust, the forward end portion of the bracket stem 73 is provided with an up-standing looped guide member 77 between the side members of which a rearwardly extending arm 78 is projected from the middle of the shoe member 60.

In both of the central divider structures herein described, the device is not only vertically adjustable but it swings horizontally with the steering movement of the wheel or wheels 12, and in this connection it is noted that the two inner plant or vine guides 40 on the standards 27 are relatively longer than the two outer guides and said inner guides are adjusted longitudinally on their supports 27 so that their forward end portions can be located relatively close to the divergent wing portions 62 of the central divider 59 but with ample clearance therebetween to permit said divider to swing laterally without interference, and the relative location of the forward end portions of said guides 40 being such that, to whatever angular position said divider 59 may move, the plants or vines are guided onto the adjacent guide members 40 by the respective wing portions 62. It is further noted that while the supporting bar 45 which carries the side separator 46 at its outer end is effective to some degree in guiding the separated plants or vines across the gap between said separator 46 and the supporting standard 27 for the cutter elements 28 at the rear of said separator 46, further guiding means is preferably provided by a rod 79 which is attached at its forward end portion to said separator 46 in the region where the downwardly off-set end portion of said bar 45 joins said separator 46, said rod 79 extending rearwardly in a plane parallel with but slightly below the body portion of said bar 45 and also slightly inwardly therefrom, the rear end portion 80 of said rod 79 being turned at an angle substantially parallel with and inwardly from the lower longitudinal portion 43 of the adjacent guide element 40 on said supporting standard 27 so as to cooperate with said lower guide member 43 and its companion upper member in deflecting the separated plants or vines inwardly so as to be acted upon by the inclined outer cutter element 28.

Obviously, the structure admits of considerable modification within the spirit of the invention as defined by the appended claims. The invention, therefore, is not limited to the specific construction and arrangements shown in the accompanying drawings.

What is claimed is:

1. In a bean harvester including a tractor having a front steering ground wheel, said wheel mounted to turn about a vertical axis in its steering movement, and a central plant and vine divider carried on the mounting of the steering ground wheel and comprising a hollow shoe portion at its forward end, longitudinal side extensions from said shoe portion straddling said wheel and being hingedly supported on the wheel mounting rearwardly of the wheel whereby said divider swings with the wheel in its steering movement but is capable of vertical swinging movement independently of said wheel, and means for suspendedly supporting the forward portion of said divider in a raised inoperative position and in different lowered positions in working relation to the ground.

2. A plant and vine divider for bean harvesters and the like, comprising in combination, a ground wheel mounted in a vertically swiveled yoke, a divider comprising a hollow shoe at its forward portion and longitudinal extensions from opposite sides of said shoe portion, said side extensions straddling the wheel and projecting rearwardly therebeyond, a frame extending rearwardly from said yoke, said frame having depending extensions at its rear end portion to which said longitudinal extensions of the hollow shoe are pivotally attached, and means for suspendedly supporting the forward shoe portion of said divider.

3. A plant and vine divider for bean harvesters and the like, comprising in combination with a pair of steering ground wheels mounted on opposite sides of a vertical supporting stem whereby to swing about the axis of said stem in steering movement, a substantially T-shaped support having a stem portion rigidly secured to the lower end of said wheel supporting stem below the rotative axis of said pair of wheels on the stem, the cross member of said T-shaped frame being located rearwardly from said wheels and the stem portion extending forwardly from the wheels and provided with an upstanding guide extension, a divider element comprising a hollow shoe portion at its forward end and elongated side extensions from said shoe portion straddling said pair of wheels and pivotally mounted at their rear end portions on the cross member of said T-shaped frame, a rearwardly extending arm on said shoe portion slidably engaging said upright guide extension on the forward end portion of said T-shaped frame, and means for suspendedly supporting the said shoe portion of said divider.

4. A bean harvester including in combination, a tractor having a medially forward steering ground wheel mounted to swing about a vertical axis, a cooperative pair of spaced relatively inclined cutter elements with rearward convergence, said pair of cutter elements being located and operated at the side of the tractor, an outer plant and vine separator disposed cooperatively in advance of the outer cutter element of the pair and laterally from the steering ground wheel, and a central plant and vine divider surrounding said steering ground wheel and carried by the wheel mounting whereby to swing with the wheel in its steering movement.

5. A bean harvester including in combination, a tractor, cooperative pairs of cutter elements, the cutter elements of each pair being spaced apart and inclined with relation to each other with rearward convergence, the respective pairs of cutter elements being located on opposite sides of the tractor with their inner cutter elements contiguous to the longitudinal axis of the tractor, the tractor having a front steering ground wheel coincident with its longitudinal axis, said wheel being mounted on the tractor to swing about a vertical axis in its steering movement, a central plant and vine divider carried by the wheel mounting and comprising a hollow shoe at its forward end and elongated side extensions from said shoe straddling the steering ground wheel, said central divider in its mounting with the wheel being swingable with the wheel in the steering movement thereof but having provision for vertical swinging movement independently of the wheel, and adjustable means including a flexible connection for suspendedly supporting the forward portion of said central divider in an inoperative raised position and in various lowered positions in working relation to the ground, said central divider having divergent wing portions at its rear end arranged in cooperative plant and vine guiding relation to the inner cutter elements of the respective pairs of said elements.

6. A bean harvester including in combination, a tractor having a front steering ground wheel mounted to swing about a vertical axis in the steering movement thereof, cooperative pairs of spaced cutter elements arranged on the tractor laterally from opposite sides of the steering ground wheel and in inclined relation to each other with rearward convergence, means for adjustably supporting said pairs of cutter elements and yieldably pressing them in working relation to the ground, guide elements located above and connected to said cutter elements whereby to be movable therewith in the respective adjustments thereof, outer plant and vine separators mounted with vertical adjustment in advance of the outer cutter elements, a central plant and vine divider surrounding the steering ground wheel and carried by the mounting thereof whereby to swing with the wheel in its steering movement but having provision in the mounting whereby the divider is vertically adjustable independently of the wheel, said central divider having divergent rear extensions in plant and vine guiding relation to the inner cutter elements of both cooperative pairs of said elements, and means for simultaneously adjusting said outer plant and vine separators and said central divider.

7. A bean harvester including in combination, a tractor having a medially forward steering ground wheel, supports mounted on opposite sides of the tractor with provision for vertically swingable movement, cutter elements mounted on said supports, spring tension means for holding said supports with the cutter elements thereon in variably pressed working relation to the ground, said cutter elements being arranged in cooperative spaced pairs and in inclined relation to each other with rearward convergence, plant and vine guiding member located above each of said cutter elements in cooperative relation thereto, plant and vine separators located on opposite sides of the tractor and cooperatively in advance of the outer cutter elements of the respective pairs of said elements and being vertically adjustable, a central plant and vine divider carried by the mounting of the steering ground wheel, surrounding the wheel and movable with the wheel in the steering movement thereof but capable of vertical movement independently of the wheel, and common means for holding the outer separators and central divider in a raised inoperative position and for simultaneously lowering said separators and divider and holding them in various lowered positions in working relation to the ground.

8. In a bean harvester or the like, an inclined cutter blade mounted on a depending support, and a plant and vine guiding element mounted on the blade support in cooperative relation above said blade, said guiding element comprising a single rod having its middle portion formed to provide a substantially U-shaped body for attachment to the blade support, the remainder of the rod being formed to provide a pair of elongated spaced rearwardly extending guide portions parallel to each other and also parallel to the body portions and to the cutting edge of said cutter blade.

9. In a bean harvester or the like, a supporting standard, an inclined cutter blade mounted on the lower end of said standard, and a plant and vine guiding device mounted on said standard above the cutter blade and comprising a single rod having its middle portion looped and formed to provide parallel supporting branches for attachment to said standard, the looped portion being disposed rearwardly of the standard and the remainder of the rod being looped and formed to provide a pair of spaced longitudinal guide portions in parallel relation to each other and also parallel to the body portions and to the cutting edge of said cutter blade, the looped portions between the body portions and said guide portions being disposed forwardly of the standard and constituting the forward working end of said guiding device.

GRAFTON H. SELF.